Figures 1, 2:
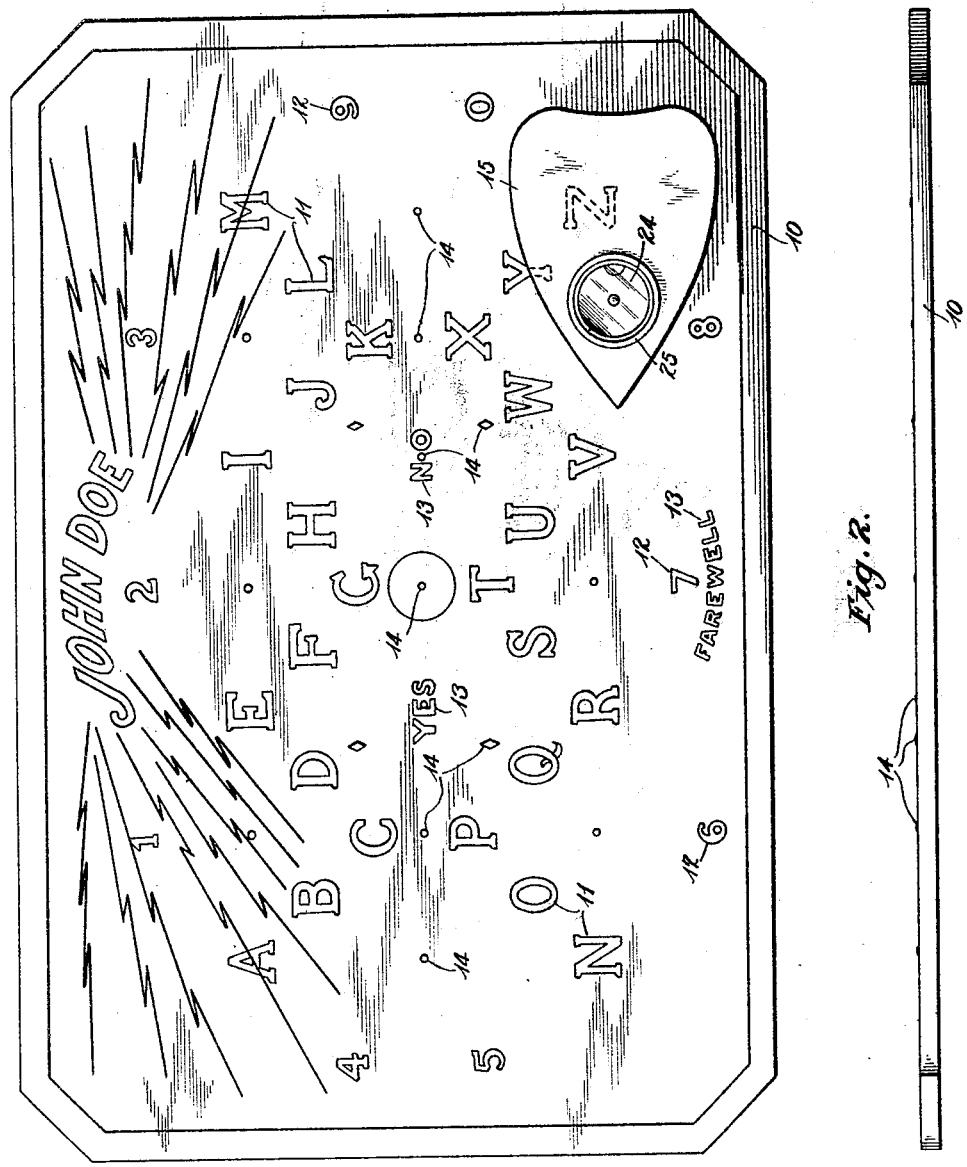

Aug. 9, 1932. W. A. FULD 1,870,677
AMUSEMENT DEVICE
Filed June 6, 1930 2 Sheets-Sheet 1

Inventor
William A. Fuld
By Brown & Phelps
Attorneys

Aug. 9, 1932.  W. A. FULD  1,870,677
AMUSEMENT DEVICE
Filed June 6, 1930  2 Sheets-Sheet 2
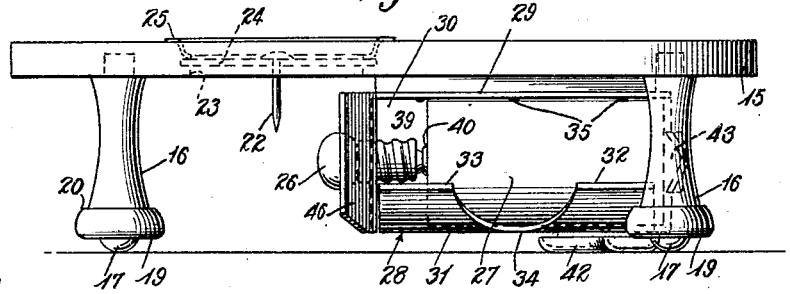
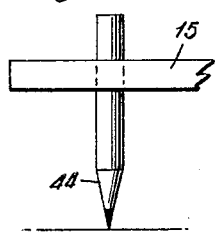
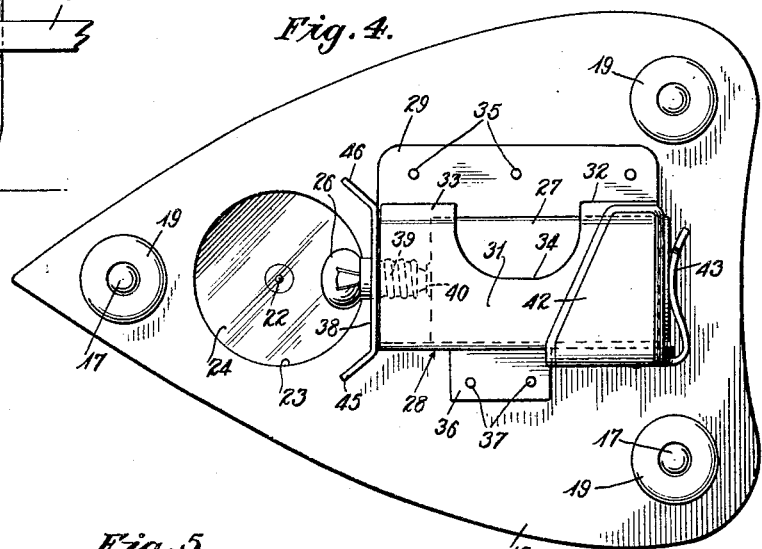
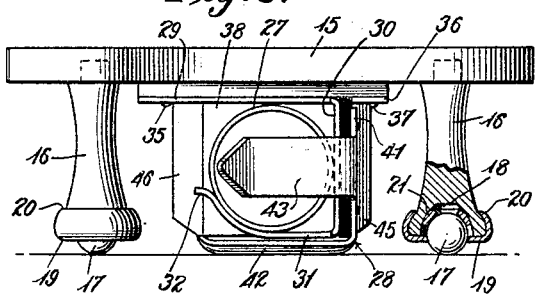
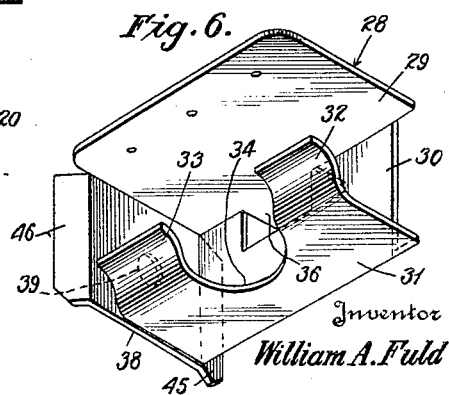
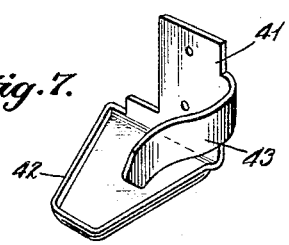
Inventor
William A. Fuld
By Brown & Phelps
Attorneys Patented Aug. 9, 1932

1,870,677

UNITED STATES PATENT OFFICE

WILLIAM A. FULD, OF BALTIMORE, MARYLAND

AMUSEMENT DEVICE

Application filed June 6, 1930. Serial No. 459,571.

The invention relates to amusement devices and has as an object the provision of a board of the nature of the well-known "Ouija" board having a plaque movable thereover with means to cause an illumination of the characters formed or indicated upon the board by movements of the plaque.

It is a further object of the invention to provide a board having protuberances thereon and a plaque movable over the board carrying an illuminating device preferably an electric lamp and battery having a switch adapted to be closed by contact with any one of said protuberances.

It is a further object of the invention to provide a plaque for use with devices of this character having mounted thereon means to illuminate the indications picked out or formed by movement of the plaque.

It is a further object of the invention to provide a plaque having anti-friction bearings for contact with a board.

It is a further object of the invention to provide a combined battery clip, lamp socket, and switch for use with the character of device referred to.

Further objects of the invention will appear from the following description when read in connection with the accompanying drawings showing an illustrative embodiment of the invention, and wherein:—

Fig. 1 is a plan view;
Fig. 2 is an edge view of the board only;
Fig. 3 is a side elevation of the plaque;
Fig. 4 is a bottom plan view of the plaque;
Fig. 5 is an end elevation showing one of the anti-friction devices in section;
Fig. 6 is a perspective view of the battery clip portion of the illuminating device;
Fig. 7 is a perspective view of the switch and one contact of the illuminating device; and
Fig. 8 is a detail side elevation of a pencil which may be used in place of one of the legs of the plaque.

As shown the device comprises a board 10 having characters as letters 11, figures 12, and words 13 whereby any variety of intelligence may be conveyed by a proper choice of characters. Interspersed with the characters referred to are shown a plurality of protuberances 14 which are desirably provided by the way of round headed nails, tacks, screws or the like inserted into the material of the board with the rounded heads projecting thereabove. Certain of the protuberances are shown polygonal in form which has no functional significance, being so indicated merely for purposes of ornamentation.

It will be seen that the said protuberances are so interspersed among the characters that the actuation of the switch, to be described, by contact with or riding upon any one of the said protuberances may result in the pointer indicating any one of a plurality of characters grouped around the said protuberances depending upon the angle at which the plaque lies upon the board at the time of contact.

To pick out characters upon the board by movement of the plaque thereover, the plaque comprising a plate 15 supported upon legs 16 may be moved over the board by the laying of the hands of the user or users upon the top of the plate in the familiar manner.

To lessen the friction of the legs 16 with the board, each of said legs is shown as provided with an anti-friction device shown as formed of a ball 17 mounted in a socket 18 in said leg and retained therein as by a cup-like member 19 having an opening of less diameter than that of the ball and having its edges swaged about an enlargement of the lower portion of the leg as indicated at 20. A ring 21 is shown to provide a bearing for the ball 17 in the socket 18.

To indicate the character to be chosen as a portion of the intelligence to be conveyed, there is shown a pointer 22 projecting downwardly from the plaque, which pointer may be observed through a window 23 shown as closed by a transparent plate 24 as of glass, celluloid, or the like retained in an opening in the board as by means of a retention ring 25.

To illuminate the chosen characters and the pointer 22 whereby to make it possible to use the board in an otherwise darkened room, there is shown an illuminating device by way of an electric lamp mounted upon the lower surface of the board. To support the lamp and a battery, as a single cell of a flashlight battery, 27, there is shown a clip member illustrated in perspective at 28, Fig. 6, comprising a plate 29 having a portion of its material turned at right angles as at 30 and again turned at an angle parallel to the portion 29 as at 31, the edges of the portion 31 being formed into resilient clip portions 32, 33 leaving a space 34 between the clips to give access to the cell for removal thereof.

One edge of the portion 29 is shown as secured to the plate 15 by fastening members 35. To provide a second point of attachment a portion of the member 30 is shown as severed therefrom and allowed to remain in the plane of the portion 29 as indicated at 36, fastening members 37 being supplied through this portion to additionally secure the clips to the plate.

An end of the member 29 is shown as turned at right angles to its plane and at right angles to the member 30 as indicated at 38, the member 38 being shown as provided with a lamp socket 39 for reception of bulb 26, the central contact of the said bulb, indicated as of the "single pole" type, contacting with the carbon portion 40 of the battery cell.

To form a switch and a second contact with the battery the element illustrated in Fig. 7 is provided comprising a plate 41 which may be attached to and insulated from the member 30 with the switch portion 42 integral with the plate 41 standing opposite to and spaced from the member 31 of the cell holder.

To provide a second contact with the cell, there is shown a resilient finger 43 extending from the plate 41 to a position where it may contact with the end of the zinc casing of the battery cell as plainly indicated in Fig. 4.

The switch member 42 is shown as rounded at its edges and the illuminating device as a whole has such dimensions that, as shown in Fig. 3, the switch member 42 will stand closely adjacent the surface of the board when the plaque is moving thereover. When the rounded edges of switch member 42 ride upon one of the protuberances 14, the switch member will be pressed into contact with the member 31 thereby completing the circuit through the lamp and illuminating both the characters on the board and the pointer 22 whereby the character chancing to be below the pointer may be noted.

If it be desired to use a plain surface board and movements of the plaque are to be depended upon to write the message to be indicated by means of movement of the board, a pencil 44 may be substituted for the leg 16 nearest the lamp 26. In the claims appended hereto the "pointer" is intended to refer to either such a pointer as shown at 22 or the point of the pencil 44. When the pencil is to be used in lieu of the characters inscribed upon the board, it is intended that the switch shall be short-circuited and the lamp shall be continuously illuminated.

In order to some extent limit the illumination of the lamp to the character particularly designated by the pointer, the member 38 is shown as provided with shields in the form of wings 45, 46 formed integral therewith and turned at angles to its plane.

The operation of the device will be clear from the foregoing description.

Minor changes may be made in the physical embodiment of the invention within the scope of the appended claims without departing from the spirit of the invention.

I claim:

1. An amusement device comprising, in combination, a board having the letters of the alphabet inscribed thereon, a plurality of protuberances projecting from the surface of said board, a plaque movable upon said board, a pointer carried by said plaque, an electric lamp and connected battery and normally open switch carried by said plaque, said switch adapted to be closed by contact with any of said protuberances to cause said lamp to illuminate said pointer and a character indicated by the pointer.

2. An amusement device comprising, in combination, a board bearing characters inscribed thereon, a plurality of protuberances carried by said board interspersed among said characters, a plaque mounted on legs movable upon the board, a combined lamp socket, battery clip and switch carried by the lower surface of said plaque, said switch adapted to be closed by contact with any of said protuberances occurring as a result of movement of the plaque to close a circuit from a battery in said clip through a lamp in said socket to illuminate a character adjacent the contacting protuberance.

3. A plaque for use with an amusement device comprising a plate, a supporting surface having protuberances projecting thereabove, legs supporting the plate, antifriction devices upon the lower ends of said legs, said plate having an opening, a transparent closure for said opening, a pointer carried by said plate visible through said opening, a combined battery clip, lamp socket and switch mounted on the lower surface of said plate, a movable member of said switch standing closely adjacent the plane of said devices and operable by contact with one of said protuberances projecting above said plane.

4. An amusement device comprising, in combination, a board bearing characters thereon, a plurality of protuberances carried by said board interspersed among said characters, a plaque mounted on legs movable on said board, an electric lamp carried by said plaque, a source of energy, a normally open electric circuit including said source of energy and said lamp, and means carried by said plaque to contact with said protuberances whereby to close said circuit.

WILLIAM A. FULD.